United States Patent
Lin

(10) Patent No.: US 10,223,568 B2
(45) Date of Patent: Mar. 5, 2019

(54) BARCODE DECODING METHOD

(71) Applicants: Qisda (Suzhou) Co., Ltd., Suzhou, Jiangsu (CN); Qisda Corporation, Taoyuan (TW)

(72) Inventor: Chi-Cheng Lin, Taoyuan (TW)

(73) Assignees: Qisda (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 45 days.

(21) Appl. No.: 15/398,663

(22) Filed: Jan. 4, 2017

(65) Prior Publication Data
US 2017/0206391 A1 Jul. 20, 2017

(30) Foreign Application Priority Data
Jan. 20, 2016 (TW) .............................. 105101639 A

(51) Int. Cl.
G06K 15/12 (2006.01)
G06K 7/14 (2006.01)
G06K 7/10 (2006.01)

(52) U.S. Cl.
CPC ........ G06K 7/1456 (2013.01); G06K 7/10722 (2013.01); G06K 7/1413 (2013.01); G06K 7/1447 (2013.01); G06K 7/1478 (2013.01)

(58) Field of Classification Search
CPC ............. G06K 7/10722; G06K 7/1413; G06K 7/1447; G06K 7/1456; G06K 7/1478
See application file for complete search history.

(56) References Cited

U.S. PATENT DOCUMENTS

| | | | |
|---|---|---|---|
| 8,393,542 B2* | 3/2013 | Nakamura | G06K 7/10762 235/462.09 |
| 9,582,703 B2* | 2/2017 | Shimazawa | G06K 19/06028 |
| 2003/0127518 A1* | 7/2003 | Park | G06K 7/14 235/462.25 |
| 2012/0173347 A1* | 7/2012 | De Almeida Neves | G06K 7/10722 705/16 |

FOREIGN PATENT DOCUMENTS

JP 2015-122015 7/2015

* cited by examiner

*Primary Examiner* — Thien M Le
*Assistant Examiner* — April Taylor

(57) ABSTRACT

A barcode decoding method includes steps of capturing an image of a barcode; dividing the image into a plurality of blocks and dividing the blocks into a plurality of longitudinal regions; calculating a representative gray level for each of the blocks; dividing at least one of the longitudinal regions into a relative majority region and a relative minority region; defining one of the relative majority region and the relative minority region as a normal region and defining the other of the relative majority region and the relative minority region as an abnormal region; selecting a block from each of the normal regions to set a scanning line; and performing a binarization algorithm for a gray level distribution of the scanning line to decode the barcode.

6 Claims, 3 Drawing Sheets

BARCODE DECODING METHOD

BACKGROUND OF THE INVENTION

1. Field of the Invention

The present invention relates to a barcode decoding method, and more particularly, to a barcode decoding method for effectively increasing decoding success rate.

2. Description of the Prior Art

A barcode is a figure identification code composed of a plurality of parallel black stripes with different widths and arranged according to a specific encoding rule to present certain messages. Since a barcode can be used to identify a product's manufacturing country, manufacturer's name, product's name, manufacturing date, book category number and sender's and recipient's mailing addresses, etc., it is therefore widely applied in many fields.

To decode an one-dimension barcode, one has to select at least one scanning line along the sidelong direction of the barcode, and then analyze the gray level distribution of the scanning line. However, a barcode may be damaged during printing or sticking, or due to light illumination, etc., resulting in the barcode not including complete information and failure of decoding such a barcode. Under this circumstance, the scanning line needs to be re-selected. The decoding efficiency thus decreases.

SUMMARY OF THE INVENTION

One of the purposes of the present invention is to provide a barcode decoding method for effectively increasing decoding success rate to solve the aforementioned problems.

According to one embodiment of the present invention, the barcode decoding method includes the steps of: capturing an image of a barcode; dividing the image into a plurality of blocks and dividing the blocks into a plurality of longitudinal regions; calculating a representative gray level for each of the blocks; dividing the blocks in at least one of the longitudinal regions into a relative majority region and a relative minority region; defining one of the relative majority region and the relative minority region as a normal region and defining the other of the relative majority region and the relative minority region as an abnormal region; selecting a block from each of the normal regions to set a scanning line; and performing a binarization algorithm for a gray level distribution of the scanning line to decode the barcode.

In sum, in the present invention the captured barcode image is divided into a plurality of blocks, and the blocks are further divided into a plurality of longitudinal regions. Then the blocks in at least one longitudinal region is divided into a normal region and an abnormal region. The normal region of such a longitudinal region is considered as a barcode region without damage and the abnormal region is considered as a barcode region with damage. Since the scanning line is selected only from the normal regions, the selected scanning line in the present invention includes complete barcode information. By such, the decoding success rate is increased.

The above-mentioned and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

Figure 1:
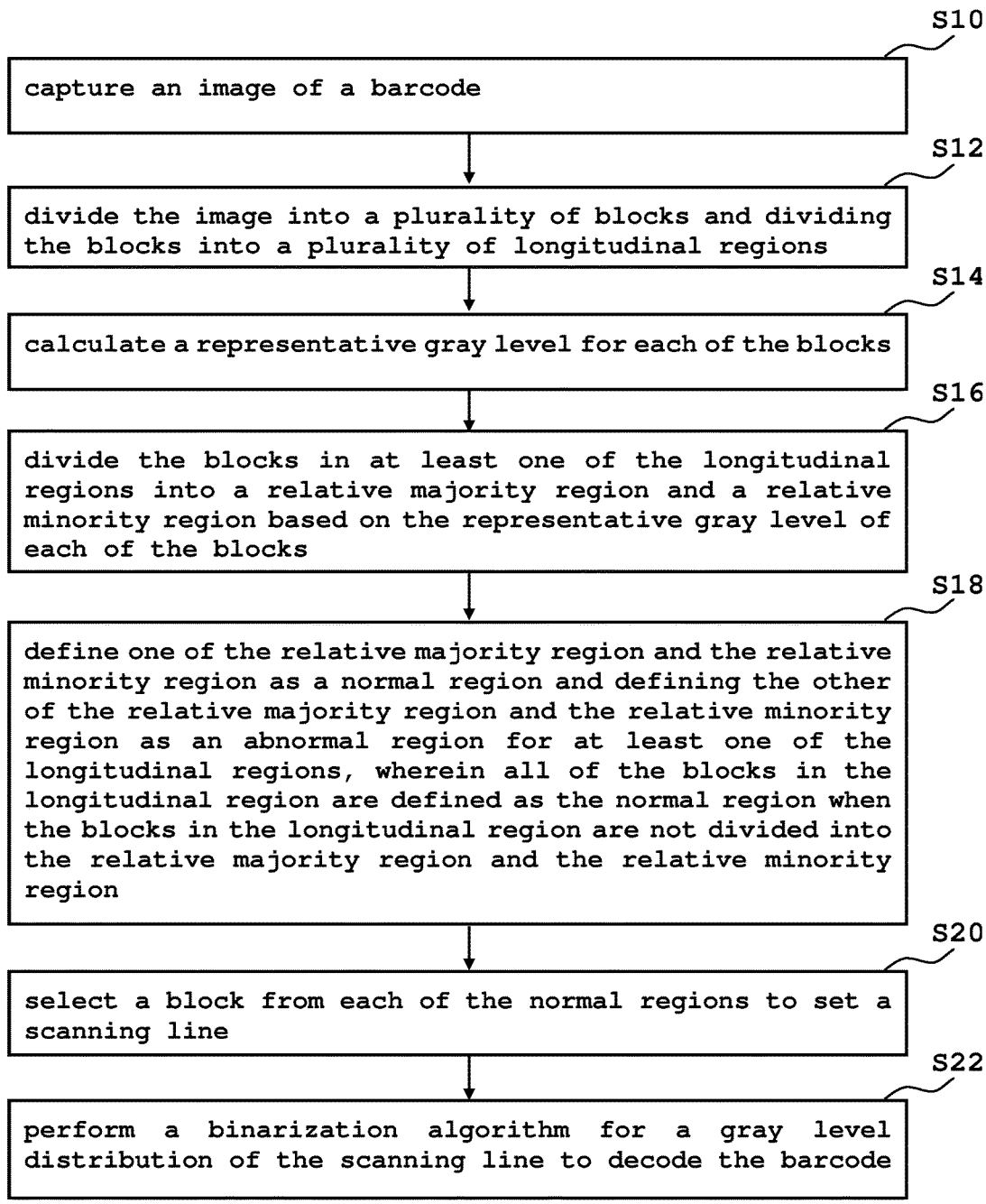
FIG. 1 is a flowchart of a barcode decoding method according to an embodiment of the present invention.
Figure 2:
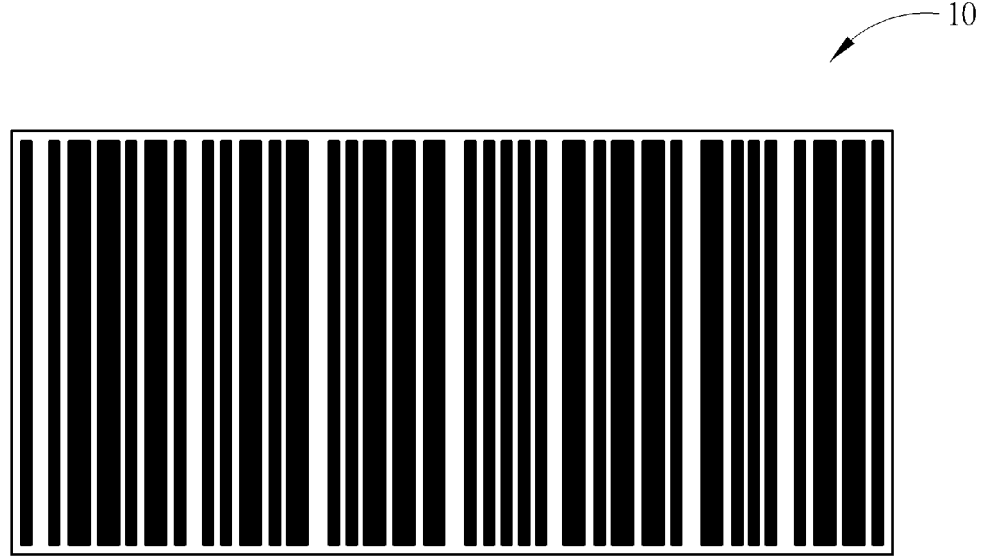
FIG. 2 is a schematic diagram of a barcode image.
Figure 3:
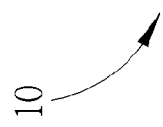
FIG. 3 is a schematic diagram of the barcode image of FIG. 2 being dividing into a plurality of blocks.

Please refer to FIG. 1 through FIG. 3. FIG. 1 is a flowchart of a barcode decoding method according to an embodiment of the present invention. FIG. 2 is a schematic diagram of an image of a barcode 10. FIG. 3 is a schematic diagram of the image of the barcode 10 of FIG. 2 being dividing into a plurality of blocks B1_1 to B14_7.

The barcode decoding method of the present invention is applicable to a barcode scanner or other types of electronic devices with barcode scanning function. When a user uses a barcode scanner or other types of electronic devices with barcode scanning function to scan the barcode 10 shown in FIG. 2, step S10 according to the embodiment of the present invention is executed to capture the image of the barcode 10. It is to be understood that after the image of the barcode 10 is captured, the image may be processed by some image processing procedures so that the image becomes a rectangular image as shown in FIG. 2.

Then step S12 is executed to divide the image of the barcode 10 into a plurality of blocks B1_1 to B14_7 and to divide the blocks B1_1 to B14_7 into a plurality of longitudinal regions C1 to C14 as shown in FIG. 3. The longitudinal region C1 includes the blocks B1_1 to B1_7, the longitudinal region C2 includes the blocks B2_1 to B2_7 and so on. It is to be understood that the number of the blocks and the number of the longitudinal regions are determined depending upon actual applications, and are not limited to what is shown in FIG. 3.

Then step S14 is executed to calculate a representative gray level for each of the blocks B1_1 to B14_7. In the embodiment, for each of the blocks B1_1 to B14_7, all pixel values are averaged to obtain the representative gray level of the block. For example, suppose the block B1_1 includes four pixels with pixel values 60, 70, 65 and 69, respectively, the representative gray level of the block B1_1 is 66, i.e. (60+70+65+69)/4.

As shown in FIG. 3, the image of the barcode 10 includes two damaged regions R1 and R2. The regions R1 and R2 may be damaged during printing or sticking, or due to light illumination, etc. To avoid selecting a scanning line from the damaged regions R1 and R2, step S16 is executed to divide the blocks in at least one of the longitudinal regions C1 to C14 into a relative majority region and a relative minority region based on the representative gray levels of the blocks B1_1 to B14_7. Generally speaking, if there is no damaged region in the barcode image, the representative gray levels of the blocks within each of the longitudinal regions are quite close to one another. Thus for the damaged regions R1 and R2, the blocks in at least one of the longitudinal regions C1 to C14 are divided into a relative majority region and a relative minority region based on a predetermined threshold. The value of the predetermined threshold can be determined depending upon actual applications.

As far as the longitudinal region C1 is concerned, since the representative gray levels of the blocks B1_1 to B1_7 are quite close to one another, and the difference in the representative gray levels between any two of the blocks B1_1 to B1_7 is less than the predetermined threshold, it is determined that the longitudinal region C1 covers no damaged region. According to the embodiment of the present invention, any of the blocks B1_1 to B1_7 can be selected to set the scanning line. Thus, there is no need to divide the blocks in the longitudinal region C1 into a relative majority region and a relative minority region. It is the similar case for the longitudinal regions C6 to C8 and C14 to the longitudinal region C1, and the details are not repeatedly described herein.

As far as the longitudinal region C2 is concerned, the blocks B2_4 to B2_7 cover no damaged region, and parts of the blocks B2_1 to B2_3 belong to the damaged region R1. Thus the difference in the representative gray levels between any two of the blocks B2_4 to B2_7 is less than the predetermined threshold, and the difference in the representative gray levels between anyone of the blocks B2_4 to B2_7 and anyone of the blocks B2_1 to B2_3 is greater than the predetermined threshold. The blocks B2_4 to B2_7 are therefore defined as the relative majority region and the blocks B2_1 to B2_3 are defined as the relative minority region. It is the similar case for the longitudinal regions C3 to C5 to the longitudinal region C2, and the details are not repeatedly described herein.

As far as the longitudinal region C9 is concerned, the blocks B9_1 to B9_3 cover no damaged region, and parts of the blocks B9_4 to B9_7 belong to the damaged region R2. Thus the difference in the representative gray levels between any two of the blocks B9_1 to B9_3 is less than the predetermined threshold, and the difference in the representative gray levels between anyone of the blocks B9_1 to B9_3 and anyone of the blocks B9_4 to B9_7 is greater than the predetermined threshold. The blocks B9_4 to B9_7 are therefore defined as the relative majority region and the blocks B9_1 to B9_3 are defined as the relative minority region. It is the similar case for the longitudinal regions C10 to C13 to the longitudinal region C9, and the details are not repeatedly described herein.

After the blocks in at least one of the longitudinal regions C1 to C14, which are the blocks in the longitudinal regions C2 to C5 and C9 to C13 in the embodiment, are divided into the relative majority region and the relative minority region, step S18 is executed to define one of the relative majority region and the relative minority region as a normal region and to define the other of the relative majority region and the relative minority region as an abnormal region. All of the blocks in the longitudinal region, however, are defined as the normal region when the blocks in the longitudinal region are not divided into the relative majority region and the relative minority region. Generally speaking, the gray level of a scanned barcode is normally within a specific gray level range, such as 50 to 120. Thus in the embodiment of the present invention the relative majority region and the relative minority region of the longitudinal region can be defined as the normal region or the abnormal region in the following way. When the representative gray level of each of the blocks in the relative majority region is within a predetermined gray level range, such as 50 to 120, the relative majority region is defined as the normal region and the relative minority region is then defined as the abnormal region. To the contrary, when the representative gray level of each of the blocks in the relative majority region is out of the predetermined gray level range, such as 50 to 120, the relative majority region is defined as the abnormal region and the relative minority region is then defined as the normal region.

As far as the longitudinal region C1 is concerned, since the representative gray levels of the blocks B1_1 to B1_7 are quite close to one another, and the difference in the representative gray levels between any two of the blocks B1_1 to B1_7 is less than the predetermined threshold, it is determined that the longitudinal region C1 covers no damaged region. Thus there is no need to divide the blocks in the longitudinal region C1 into the relative majority region and the relative minority region. Since the blocks B1_1 to B1_7 of the longitudinal region C1 are not divided into the relative majority region and the relative minority region, all of the blocks B1_1 to B1_7 of the longitudinal region C1 are defined as the normal region. It is the similar case for the longitudinal regions C6 to C8 and C14 to the longitudinal region C1, and the details are not repeatedly described herein.

As far as the longitudinal region C2 is concerned, the representative gray level for each of the blocks B2_4 to B2_7 of the relative majority region is in the predetermined gray level range, so the blocks B2_4 to B2_7 of the relative majority region are defined as the normal region, and the blocks B2_1 to B2_3 of the relative minority region are defined as the abnormal region. It is the similar case for the longitudinal regions C3 to C5 to the longitudinal region C2, and the details are not repeatedly described herein.

As far as the longitudinal region C9 is concerned, the representative gray level for each of the blocks B9_4 to B9_7 of the relative majority region is out of the predetermined gray level range, so the blocks B9_4 to B9_7 of the relative majority region are defined as the abnormal region, and the blocks B9_1 to B9_3 of the relative minority region are defined as the normal region. It is the similar case for the longitudinal regions C10 to C13 to the longitudinal region C9, and the details are not repeatedly described herein.

Step S20 is then executed to select one block from each of the normal regions, and a scanning line 12 is set within the range of the selected blocks. As shown in FIG. 3, a combined line within the selected blocks B1_4, B2_4, B3_4, B4_4, B5_4, B6_4, B7_4, B8_4, B9_3, B10_3, B11_3, B12_3, B13_3 and B14_3 is set to be the scanning line 12

Finally, step S22 is executed to performing a binarization algorithm for the gray level distribution of the scanning line 12 to decode the barcode 10. It is to be understood that the binarization algorithm is an image processing algorithm to set the original gray level of the pixel as the maximum gray level when the original gray level is greater than a specific gray level threshold, and to set the original gray level of the pixel as the minimum gray level when the original gray level is less than the specific gray level threshold. Since the binarization algorithm is well known by people having ordinary skill in the art, it is not repeatedly described in details herein.

Regarding the normal region and the abnormal region defined in step S18 described above, according to the embodiment of the present invention, it can be defined in another way described below. The relative majority region is first defined as the normal region, and the relative minority region is defined as the abnormal region.

As far as the longitudinal region C1 is concerned, since the representative gray levels of the blocks B1_1 to B1_7 are quite close to one another, and the difference in the representative gray levels between any two of the blocks B1_1 to B1_7 is less the predetermined threshold, it is determined that the longitudinal region C1 covers no damaged region. According to the embodiment of the present invention, all of the blocks B1_1 to B1_7 of the longitudinal region C1 are defined as the normal region. It is the similar case for the longitudinal regions C6 to C8 and C14 to the longitudinal region C1, and the details are not repeatedly described herein.

As far as the longitudinal region C2 is concerned, the blocks B2_4 to B2_7 of the relative majority region are first defined as the normal region, and the blocks B2_1 to B2_3 of the relative minority region are defined as the abnormal region. It is the similar case for the longitudinal regions C3 to C5 to the longitudinal region C2, and the details are not repeatedly described herein.

As far as the longitudinal region C9 is concerned, the blocks B9_4 to B9_7 of the relative majority region are first defined as the normal region, and the blocks B9_1 to B9_3 of the relative minority region are defined as the abnormal region. It is the similar case for the longitudinal regions C10 to C13 to the longitudinal region C9, and the details are not repeatedly described herein.

Then aforementioned steps S20 and S22 are executed. Since the blocks B9_4 to B9_7, B10_4 to B10_7, B11_4 to B11_7, B12_4 to B12_7 and B13_4 to B13_7 of the relative majority regions in the longitudinal regions C9 to C13 actually cover the damaged region R2, the decoding result of the scanning line set according to the blocks B9_4 to B9_7, B10_4 to B10_7, B11_4 to B11_7, B12_4 to B12_7 and B13_4 to B13_7 would be incorrect. Thus, in the embodiment of the present invention the relative majority region, i.e. the blocks B9_4 to B9_7, B10_4 to B10_7, B11_4 to B11_7, B12_4 to B12_7 and B13_4 to B13_7, are then re-defined as the abnormal region and the relative minority region, i.e. the blocks B9_1 to B9_3, B10_1 to B10_3, B11_1 to B11_3, B12_1 to B12_3 and B13_1 to B13_3, are re-defined as the normal region. Besides, according to the encoding rule of the barcode 10, it can also be known that the incorrect decoding result of the scanning line results from the longitudinal regions C9 to C13. Thus, the blocks in the relative majority regions of the longitudinal regions C9 to C13, i.e. B9_4 to B9_7, B10_4 to B10_7, B11_4 to B11_7, B12_4 to B12_7 and B13_4 to B13_7, are re-defined as the abnormal region and the blocks of the relative minority regions, i.e. B9_1 to B9_3, B10_1 to B10_3, B11_1 to B11_3, B12_1 to B12_3 and B13_1 to B13_3, are re-defined as the normal region. Steps S20 and S22 are then executed again so as to successfully decode the barcode 10.

It is to be understood that in the present invention the control logic can be implemented by software design. The software can be executed in the barcode scanner or other types of electronic devices with barcode scanning function. Of course, each part or function of aforementioned control logic can be implemented by software, hardware or the combination thereof. Moreover, the control logic of the barcode decoding method according to the present invention can be stored in the computer-readable storage medium, and the instruction data stored in the computer-readable storage medium can be executed by the barcode scanner or other types of electronic devices with barcode scanning function to generate control commands so as to perform corresponding functions.

In sum, in the present invention the captured barcode image is divided into a plurality of blocks, and the blocks are further divided into a plurality of longitudinal regions. Then the blocks of at least one longitudinal region is divided into a normal region and an abnormal region. The normal region is considered as a barcode region without damage and the abnormal region is considered as a barcode region with damage. Since the scanning line is selected only from the normal regions, the selected scanning line in the present invention includes complete barcode information. By such, the decoding success rate is increased.

Those skilled in the art will readily observe that numerous modifications and alterations of the method may be made while retaining the teachings of the invention.

What is claimed is:

1. A barcode decoding method comprising:
    capturing an image of a barcode by an image capture device;
    dividing the image into a plurality of blocks and dividing the blocks into a plurality of longitudinal regions by a controller;
    calculating a representative gray level for each of the blocks by the controller;
    dividing the blocks in at least one of the longitudinal regions into a relative majority region and a relative minority region based on the representative gray level of each of the blocks by the controller;
    defining one of the relative majority region and the relative minority region as a normal region and defining the other of the relative majority region and the relative minority region as an abnormal region for at least one of the longitudinal regions by the controller, wherein all of the blocks in the longitudinal region are defined as the normal region by the controller when the blocks in the longitudinal region are not divided into the relative majority region and the relative minority region;
    selecting a block from each of the normal regions by the controller to set a scanning line; and
    performing a binarization algorithm for a gray level distribution of the scanning line by the controller to decode the barcode;
    wherein the controller is implemented by at least one of an element in a group consisting of: a central process unit (CPU), a memory device, a storage device, and the arbitrary combinations thereof.

2. The barcode decoding method of claim 1, wherein the defining step further comprising:
    defining the relative majority region as the normal region and defining the relative minority region as the abnormal region by the controller.

3. The barcode decoding method of claim 2, wherein the defining step further comprising:
    re-defining the relative majority region as the abnormal region and re-defining the relative minority region as the normal region by the controller when decoding result based on defining the relative majority region as the normal region is incorrect.

4. The barcode decoding method of claim 1, wherein the defining step further comprising:
    defining the relative majority region as the normal region and defining the relative minority region as the abnormal region by the controller when the representative gray level of each of the blocks in the relative majority region is within a predetermined gray level range; or
    defining the relative majority region as the abnormal region and defining the relative minority region as the normal region by the controller when the representative gray level of each of the blocks in the relative majority region is out of the predetermined gray level range.

5. The barcode decoding method of claim 1, wherein the calculating step further comprising:
    averaging all pixel values for each of the blocks by the controller to obtain the representative gray level of each of the blocks.

6. The barcode decoding method of claim 1, wherein at least one of a difference in the representative gray levels between any two blocks in the relative majority region and a difference in the representative gray levels between any two blocks in the relative minority region is less than a predetermine threshold, and a difference in the representative gray levels between any block in the relative majority region and any block in the relative minority region for the longitudinal region is greater than the predetermined threshold.

* * * * *